United States Patent
Bar Bracha et al.

(10) Patent No.: US 9,591,316 B2
(45) Date of Patent: Mar. 7, 2017

(54) SCALABLE VIDEO ENCODING RATE ADAPTATION BASED ON PERCEIVED QUALITY

(71) Applicants: Vered Bar Bracha, Hos Hasharon (IL); Segev Ravgad, Tel Aviv (IL); Tal Taz Azogui, Petach Tikva (IL); Yiting Liao, Hillsboro, OR (US); Vallabhajosyula Zulu Somayazulu, Portland, OR (US)

(72) Inventors: Vered Bar Bracha, Hos Hasharon (IL); Segev Ravgad, Tel Aviv (IL); Tal Taz Azogui, Petach Tikva (IL); Yiting Liao, Hillsboro, OR (US); Vallabhajosyula Zulu Somayazulu, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 345 days.

(21) Appl. No.: 14/227,729

(22) Filed: Mar. 27, 2014

(65) Prior Publication Data
US 2015/0281709 A1    Oct. 1, 2015

(51) Int. Cl.
*H04N 19/37* (2014.01)
*H04N 19/36* (2014.01)
(Continued)

(52) U.S. Cl.
CPC ........... *H04N 19/36* (2014.11); *H04N 19/132* (2014.11); *H04N 19/164* (2014.11);
(Continued)

(58) Field of Classification Search
CPC ............................. H04N 19/37; H04N 19/463
(Continued)

(56) References Cited

U.S. PATENT DOCUMENTS

| 6,937,770 B1* | 8/2005 | Oguz .................. H04N 19/176 375/240.2 |
| 6,968,091 B2* | 11/2005 | Faibish .................. G06T 9/005 375/240.03 |

(Continued)

OTHER PUBLICATIONS

An Adaptive System for Real-time Scalable Video Streaming With End-To-End QOS Control; Beilue Shao et al.; Ecole Polytechnique Federale de Lausanne (EPFL); 4 pages.
(Continued)

*Primary Examiner* — Shan Elahi
(74) *Attorney, Agent, or Firm* — Green, Howard & Mughal LLP

(57) ABSTRACT

Multi-layered video structures are scaled over a range of perceived quality levels. An estimated Mean Opinion Score (eMOS)-based encoder control loop is utilized to determine one or more encoder key performance index (KPI) associated with a particular perceived quality level. A KPI-based encoder control loop is then utilized to guide generation of a hierarchical structure having quality and/or temporal and/or spatial enhancement layers, without recalculating eMOS for the scalable structure. In addition, eMOS is used to guide the generation of a hierarchical structure at best-perceived quality levels for a given bitrate budget. Rate adaptation may occur by dropping segments, changing hierarchical structure, or changing the KPI target values. With the structure scaled as a function of perceived quality, perceived quality is impacted predictably as the encoding rate is adapted.

16 Claims, 12 Drawing Sheets

(51) Int. Cl.
  *H04N 19/132* (2014.01)
  *H04N 19/164* (2014.01)
  *H04N 19/187* (2014.01)
  *H04N 19/33* (2014.01)
  *H04N 19/31* (2014.01)

(52) U.S. Cl.
  CPC ............ *H04N 19/187* (2014.11); *H04N 19/31* (2014.11); *H04N 19/33* (2014.11)

(58) Field of Classification Search
  USPC .................................................. 375/240.26
  See application file for complete search history.

(56) References Cited

U.S. PATENT DOCUMENTS

| | | | | |
|---|---|---|---|---|
| 7,583,730 | B2* | 9/2009 | Wu | H04N 19/34 348/412.1 |
| 7,724,972 | B2* | 5/2010 | Wang | H04N 19/147 375/240.24 |
| 8,422,546 | B2* | 4/2013 | Lin | H04N 19/176 375/240 |
| 8,917,674 | B2* | 12/2014 | Karaoguz | H04N 19/89 370/329 |
| 2002/0071485 | A1* | 6/2002 | Caglar | H04N 21/23406 375/240.01 |
| 2002/0071486 | A1* | 6/2002 | Van Der Schaar | H04N 21/2402 375/240.01 |
| 2005/0175093 | A1* | 8/2005 | Haskell | H04N 19/159 375/240.03 |
| 2006/0146934 | A1* | 7/2006 | Caglar | H04N 21/23406 375/240.12 |
| 2007/0036227 | A1* | 2/2007 | Ishtiaq | H04N 19/172 375/240.26 |
| 2007/0091816 | A1* | 4/2007 | Lee | H04N 21/2662 370/252 |
| 2007/0121723 | A1* | 5/2007 | Mathew | H04N 21/234327 375/240.12 |
| 2007/0133608 | A1* | 6/2007 | Isambart | H04N 17/004 370/484 |
| 2007/0199011 | A1* | 8/2007 | Zhang | H04N 19/61 725/1 |
| 2007/0223582 | A1* | 9/2007 | Borer | H04N 19/619 375/240.12 |
| 2008/0165848 | A1* | 7/2008 | Ye | H04N 19/105 375/240.13 |
| 2008/0165861 | A1* | 7/2008 | Wen | H04N 19/139 375/240.26 |
| 2008/0260042 | A1* | 10/2008 | Shah | H04N 19/197 375/240.25 |
| 2008/0291842 | A1* | 11/2008 | Isambart | H04N 17/004 370/252 |
| 2008/0312986 | A1* | 12/2008 | Braun | G06Q 10/06 705/7.22 |
| 2009/0103610 | A1* | 4/2009 | Puri | H04N 19/159 375/240.03 |
| 2009/0323632 | A1* | 12/2009 | Nix | H04L 29/125 370/331 |
| 2010/0061446 | A1* | 3/2010 | Hands | H04N 19/196 375/240.02 |
| 2010/0110199 | A1* | 5/2010 | Winkler | H04N 7/52 348/180 |
| 2011/0206289 | A1* | 8/2011 | Dikbas | H04N 19/00484 382/238 |
| 2012/0117225 | A1* | 5/2012 | Kordasiewicz | H04L 65/1083 709/224 |
| 2013/0229485 | A1* | 9/2013 | Rusanovskyy | H04N 13/0048 348/43 |
| 2013/0290493 | A1 | 10/2013 | Oyman et al. | |
| 2013/0297743 | A1 | 11/2013 | Eschet et al. | |
| 2014/0003491 | A1* | 1/2014 | Chen | H04N 19/597 375/240.02 |
| 2014/0003492 | A1* | 1/2014 | Chen | H04N 19/597 375/240.02 |
| 2014/0010294 | A1* | 1/2014 | Ye | H04N 19/00424 375/240.12 |
| 2014/0040498 | A1 | 2/2014 | Oyman et al. | |
| 2014/0044193 | A1* | 2/2014 | Dikbas | H04N 19/00484 375/240.19 |
| 2014/0162629 | A1* | 6/2014 | Tipton | H04W 24/02 455/423 |
| 2014/0218473 | A1* | 8/2014 | Hannuksela | H04N 19/597 348/43 |

OTHER PUBLICATIONS

H.264 Coarse Grain Scalable (CGS) and Medium Grain Scalable (MGS) Encoded Video: A Trace Based Traffic and Quality Evaluation; Rohan Gupta et al.; 0018-9316 2012 IEEE; 2 pages.
A Resolution Adaptive Video Compression System; Serhan Uslubas et al.; Intel.Multimedia Communication: Tech and Appli. SCI 280; pp. 167-194; Springer-Verlag Berlin Heidelberg 2010. 28 pages.
Overview of the Scalable H.264/MPEG4-AAVC Extension; Heiko Schwarz et al.; Fraunhofer Institute for Telecommunications; 4 pages.
Layer-Encoded Video in Scalable Adaptive Streaming; Michael Zink et al.; 1520-9210 IEEE; 10 pages.
A Tutorial on H.264/SVC Scalable Video Coding and Its Tradeoff Between Quality, Coding Efficiency and Performance; Iraide Unanue et al.; Techalia Research & Innovation; 25 pages.
Video Quality Equalization Based on an Estimated MOS Using a Very Large-Size Buffer; Toshiyuki Yoshida; Dept. of Information Service; Faculty of Eng., University of Fukui, 910-8507 Japan; 4 pages.
International Search Report and Written Opinion of the International Searching Authority for International Application No. PCT/US2015/022855, mailed on Jun. 29, 2015, 17 pages.
M. Claeys, et al. "Design of a Q-Learning-based Client Quality Selection Algorithm for HTTP Adaptive Video Streaming", In: Adaptive and Learning Agents Workshop, Part of AAMAS 2013, Proceedings, pp. 30-37, May 6-10, 2013., 8 pages.
International Preliminary Report on Patentability for International Patent Application No. PCT/US2015/022855, mailed on Oct. 6, 2016.

* cited by examiner

SCALABLE VIDEO ENCODING RATE ADAPTATION BASED ON PERCEIVED QUALITY

BACKGROUND

Video encoding technology enables efficient transmission of digital video. Some real-time video streaming applications, such as video conferencing, are particularly demanding because user experience depends on efficient and robust encoding techniques for minimal delay and adequate image quality. Wireless channels as a platform for video transmission further constrain encoding technology because the underlying networks often have very dynamic channel bandwidth.

The number of bits required for encoding each video frame is referred to as the encoding rate and is often not constant throughout a video sequence. Rate control is implemented at the video encoder to guarantee successful decoding and displaying of the video data streamed into the decoder. Video codecs have adjustable compression parameters to increase or decrease the encoding rates in order to accommodate the different transmission bandwidths of the various types of channels.

Provisions for Scalable Video Coding (SVC) are included in Annex G extension of the H.264/MPEG-4 Part 10 Advanced Video Codec (AVC) video compression standard. The H.264 standard has been prepared by the Joint Video Team (JVT), which includes ITU-T SG16 Q.6, also known as VCEG (Video Coding Expert Group), and of the ISO-IEC JTC1/SC29/WG11 (2003), known as MPEG (Motion Picture Expert Group). SVC standardizes the encoding of a video bit stream that also contains one or more subset bit stream requiring less bandwidth. The subset bit streams may support different spatial resolutions (screen sizes), different temporal resolutions (frame rates), or different quality (SNR) video signals.

SVC technology may be useful in real-time video streaming applications as a means of dealing with variations in encoder bitrate budget. Within the SVC standard there is considerable latitude for implementations that may offer a superior video streaming service as there is a complex relationship between video quality and the quantity of the data needed to represent the video (i.e., bitrate). In general, the higher the bitrate, the more accurate is the spatial frequency spectrum approximation of an encoder. Yet, higher accuracy may not necessary yield higher perceived quality for the human viewer.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION OF EXEMPLARY EMBODIMENTS

Figure 1:
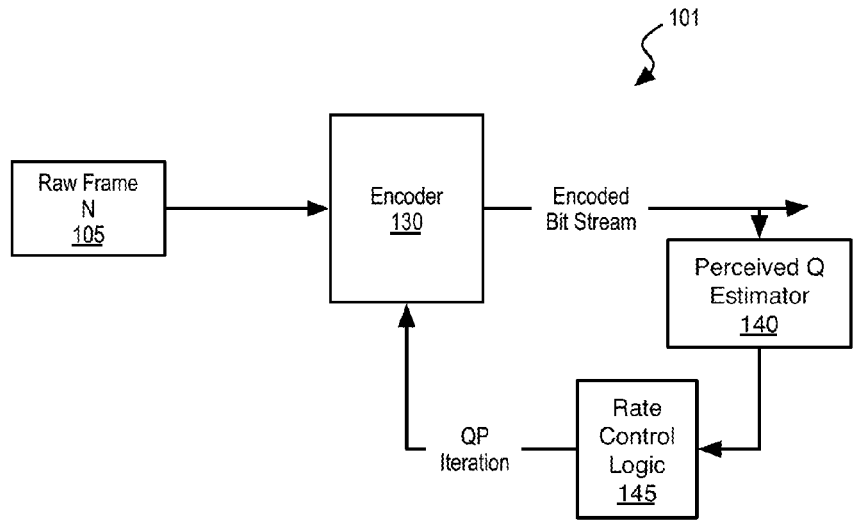
FIG. 1 is a functional block diagram of a perceived quality-based video encoding rate control architecture, in accordance with an embodiment.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications beyond what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that embodiments may be practiced without these specific details. Well-known methods and devices are shown in block diagram form, rather than in detail, to avoid obscuring more significant aspects. References throughout this specification to "an embodiment" or "one embodiment" mean that a particular feature, structure, function, or characteristic described in connection with the embodiment is included in at least one embodiment. Thus, the appearances of the phrase "in an embodiment" or "in one embodiment" in various places throughout this specification are not necessarily referring to the same embodiment. Furthermore, the particular features, structures, functions, or characteristics described in the context of an embodiment may be combined in any suitable manner in one or more embodiments. For example, a first embodiment may be combined with a second embodiment anywhere the particular features, structures, functions, or characteristics associated with the two embodiments are not mutually exclusive.

As used in the description of the exemplary embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

As used throughout the description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "computing," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's circuitry including registers and memories into other data similarly represented as physical quantities within the computer system memories or registers or other such information storage, transmission or display devices.

While the following description sets forth various implementations that may be manifested in architectures such system-on-a-chip (SoC) architectures or GPU architectures for example, implementation of the techniques and/or arrangements described herein are not restricted to particular architectures and/or computing systems and may be implemented by any architecture and/or computing system for similar purposes. Various architectures employing, for example, multiple integrated circuit (IC) chips and/or packages, and/or various computing devices and/or consumer electronic (CE) devices such as set-top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. Furthermore, some material such as, for example, control structures and full software instruction sequences, may not be shown in detail in order not to obscure the material disclosed herein.

Certain portions of the material disclosed herein are implemented in hardware, for example as logic circuitry in a graphics processor. Certain other portions may be implemented in hardware, firmware, software, or any combination thereof. At least some of the material disclosed herein may also be implemented as instructions stored on a machine-readable medium, which may be read and executed by one or more processors (graphics processors and/or central processors). A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other similarly non-transitory, tangible media.

One or more system, apparatus, method, and computer readable media are described below for encoding scalable video structures based on user perceived, or subjective, quality. In embodiments, quality-based rate control is performed with a quality measure determining the encoding configuration. Rate adaptation is provided through real-time (e.g., per frame) control over the perceived quality metric target and hierarchical encoding structure to maintain the best subjective quality level for the contemporaneous network conditions. In embodiments, an objective quality measure is associated with a subjective quality measure and the objective quality measure is utilized as a basis for controlling/adapting the encoder configuration.

In embodiments, a video encoding bitrate is determined by a perceived-quality based rate controller targeting a predetermined perceived quality. FIG. 1 is a functional block diagram of a perceived quality-based video encoding rate control architecture 101, in accordance with an embodiment. Architecture 101 includes an encoder 130, which in the exemplary embodiment is a hardware accelerated encoder core implementing a codec in conformance with one or more of the H.264 standard, H.265 (HEVC) ISO/IEC 23008-2 MPEG-H Part 2 and ITU-T H.265 standard, VP8 (RFC 6386) standard, or VP9. Encoder 130 is configured into a mode with a fixed quantization parameter (QP) and no internal rate control. During operation, encoder 130 receives a raw frame N (e.g., in YUV) format from a memory, and outputs an encoded bit stream, which may then be buffered into a memory, for example within a transmission or display pipeline. The encoded bit stream is further monitored by video perceived quality estimator 140, which may be local to encoder 130, or at a remote receiver. In the exemplary embodiment, video quality estimator 140 performs a perceptual evaluation of video quality (PEVQ) of the encoder output. The interested reader is referred to the International Standard ITU-T Recommendation J.247(08/08) for further information pertaining to PEVQ. PEVQ may include an algorithm for scoring the picture quality of a video segment by means of a 5-point Mean Opinion Score (MOS). The measurement algorithm executed by estimator 140 can assess visible artifacts caused by the digital video encoding/decoding process, and is typically based on a non-linear, weighted combination of objective parameters, such as bitrate, frame rate, packet loss rate, jitter, etc.

In the exemplary embodiment illustrated in FIG. 1, a "no reference" measurement algorithm is employed where the originating quality of the source reference is unknown and an estimate of MOS (eMOS) is generated based only on the encoded bit stream. An eMOS may be determined for a video sequence, for example extending over a last N video frames, with a higher eMOS associated with better perceived quality. Video perceived quality estimator 140 is coupled to control logic 145 responsible for configuring parameters of encoder 130 affecting the encoding rate. In one exemplary embodiment, control logic 145 outputs an encoder control signal coupled to encoder 130 that specifies the QP value to be employed for encoding of a subsequent video frame or sequence of frames that will best match the eMOS to a target perceived quality level or threshold (e.g., 3.5, 4.0, 4.5, etc.).

Figure 2:
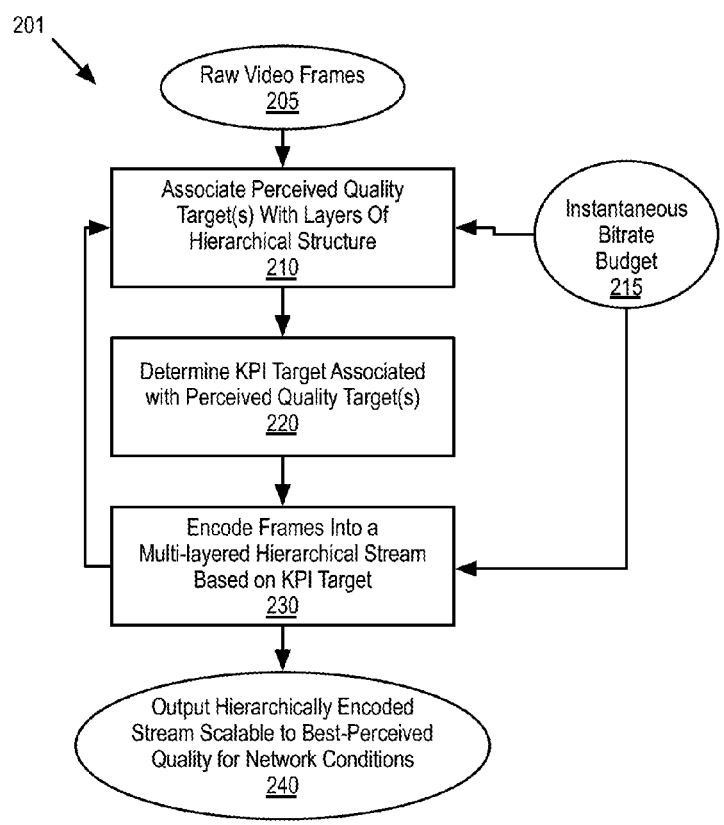
FIG. 2 is a flow diagram illustrating a perceived quality-based video encoding rate control method, in accordance with an embodiment.

In an embodiment, video frames are encoded into a hierarchical stream using encoding parameter values determined based on an encoding performance indicator target associated with a perceived quality target assigned to each layer of the hierarchical stream. FIG. 2 is a flow diagram illustrating a perceived quality-based video encoding rate control method 201, in accordance with one embodiment. Method 201 begins at operation 205 with receiving raw video frames, such as frame 105 in FIG. 1. At operation 210 perceived quality level targets are assigned to layers of a hierarchical structure.

The hierarchical stream structure includes a base layer and one or more temporal enhancement layer, and/or one or more quality (SNR) enhancement layer. One or more spatial enhancement layer may also be present. Generally, a hierarchical structure may increase coding efficiency through inter-layer prediction where a dependent enhancement layer sample is predicted from lower layer pictures (reference layers). A stream of the lowest hierarchical layer is constructed from base layer temporal frames, referred to as "key" frames. These base layer temporal frames are encoded to a base layer quality and base layer spatial resolution. The dependent streams may be constructed from combinations of temporal enhancement layers, increasing frame rate beyond that of the key frames. Each of the temporal enhancement layers may further have one or more quality layers and/or spatial resolutions.

The various layers of a given hierarchy are assigned a perceived quality metric target. The assignment may be based on a current bitrate budget received at operation 215. One perceived quality score or level (e.g., eMOS 4) might be assigned to all layers of a given hierarchy. For example, multiple temporal enhancement layers (e.g., a dyadic 4 structure) may be associated with one perceived quality level. Multiple perceived quality levels may also be associated with a hierarchical structure. For example, base layer quality frames may be associated with a lower eMOS than are enhancement layer quality frames.

At operation 220, an encoding key performance indicator (KPI) is determined for the perceived quality target value associated with each layer of a hierarchical stream. The encoding KPI is an objective metric that may advantageously guide the encoder in different spatial/temporal/quantization structures where variable temporal reference distances between frames of dependent layers might otherwise complicate the perceived quality estimation of a scaled output stream. The encoding KPI, once associated with a perceived quality level, may enable perceived quality encoder rate control for a scalable output stream.

Method 201 continues at operation 230 where frames are encoded in one or more hierarchical stream based on a target encoding KPI target. As described further below, the contemporaneous (instantaneous) bitrate budget and quality target may be utilized to select encode candidate frames to construct a perceived quality-based hierarchical structure substantially in real-time. Alternatively, one or more predetermined structures targeting a particular perceived quality range may be prepared at operation 230 with any frame drop then to occur at a later stage, again based on the instantaneous bitrate budget and perceived quality target. Method 201 completes at operation 240 with output of the hierarchically encoded stream that is scalable from a lowest-perceived quality level to the best-perceived quality level as a function of the instantaneous network conditions.

As noted above, a perceived quality measurement algorithm, such as a NR eMOS estimator, suitable for perceived quality-based rate control of a single-layer output stream may be susceptible to error as the motion vector/residual ratio changes in a multi-layered stream. As such, in certain embodiments herein, the encoding KPI is determined for a given perceived quality target using a full reference (FR) PEVQ architecture. In the exemplary embodiment, the KPI is signal-to-noise ratio (SNR), and more particularly a peak SNR (PSNR), such as but not limited to luma PSNR (PSNRY). PSNR may be determined based on a difference analysis between a raw video frame and a corresponding reconstructed reference frame. In further embodiments, one or more KPI statistics, such as, but not limited to, a PSNR mean, PSNR median, PSNR max, PSNR min, PSNR standard deviation, PSNR quartile, etc. may be associated with a perceived quality level (e.g., eMOS) determined for a given frame sequence. Furthermore, while the inventors have found PSNR to be an advantageous KPI, other objective metrics, such as, but not limited to, the structural similarity (SSIM) index may be similarly utilized.

Figure 3A:
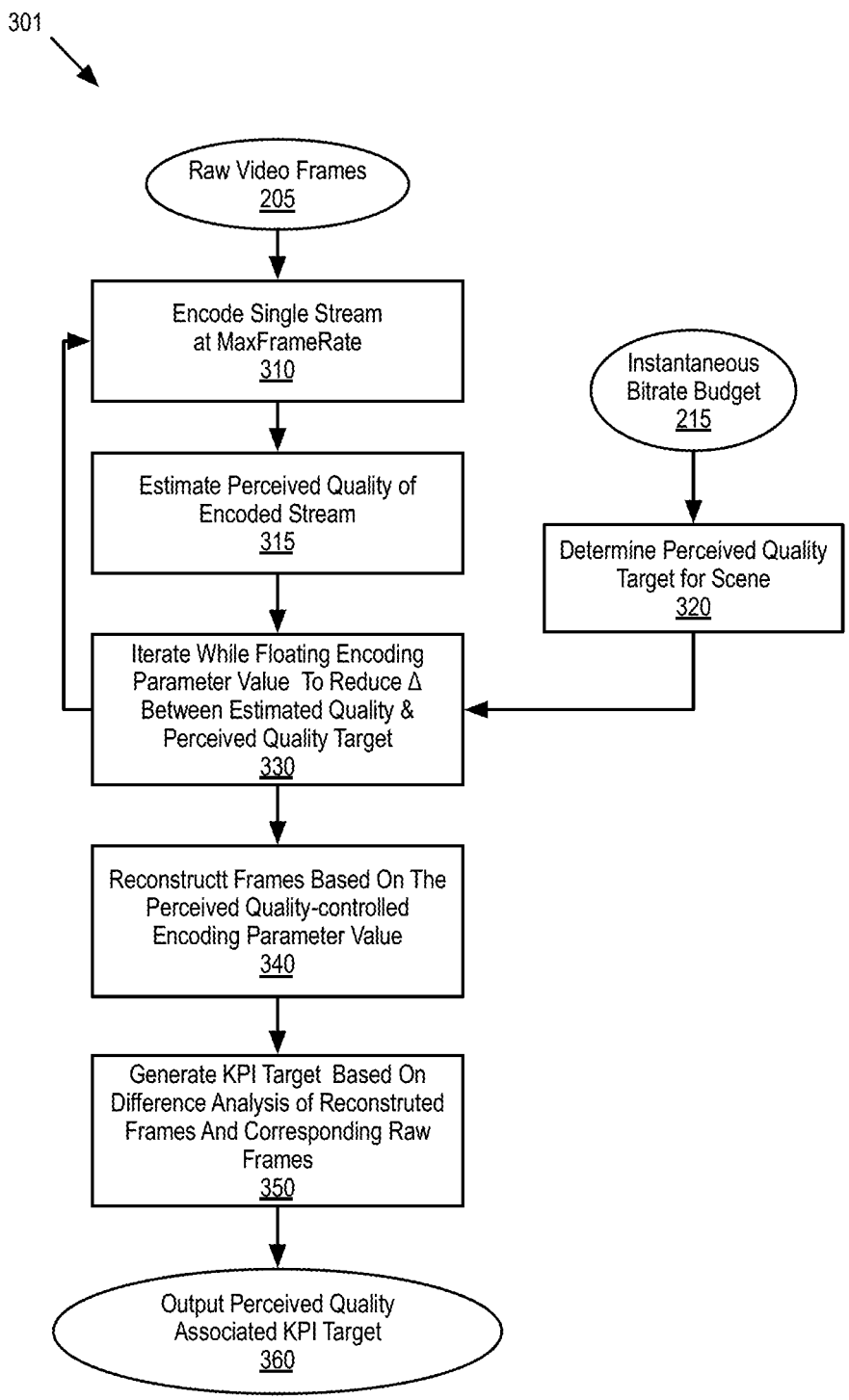
FIG. 3A is a flow diagram illustrating a method of associating a KPI target with a perceived quality target, in accordance with an embodiment.

FIG. 3A is a flow diagram illustrating a method 301 for associating a KPI target with a perceived quality level target, in accordance with an embodiment. Method 301 may be performed as part of operation 220 in FIG. 2 during a calibration phase directed toward extracting a unique KPI target for a particular video scene that can be used to control encoding of the frames into any scalable video structure. Method 301 begins with receiving raw video frames at operation 205. The frames are encoded into a calibration structure having a fixed frame rate that is suitable for perceived quality-controlled encoding. In one exemplary embodiment, the calibration structure is a single layer stream with a predetermined and constant maximum frame rate. At operation 315, the perceived quality of encoded frames is estimated, for example with NR eMOS estimator logic. Based on the instantaneous bitrate budget received or determined in any conventional manner at operation 215, a perceived quality level target is selected for the video scene at operation 320. For example, with a sufficient bitrate budget, an eMOS target score of 4.5 may be selected. Where instantaneous bitrate budget is lower, a target eMOS of 4.0, or even 3.5 may be selected at operation 320. At operation 330, eMOS quality-controlled encoding parameter values corresponding to the perceived quality target are determined by floating the quality-controlled encoding parameter and iteratively encoding frames following the calibration structure until the perceived quality target is achieved. For example, QP may be floated with each QP value iteration selected to reduce the difference between the eMOS associated with frames from the last QP iteration and the target eMOS. In this manner, the perceived quality level (e.g., eMOS) is used to optimize an encoding parameter (e.g., QP) for all frames in the calibration structure.

Method 301 continues with calculating a KPI associated with the reconstructed calibration structure as encoded with the perceived quality optimized encoding parameter. At operation 340, one or more frame encoded with the optimized encoding parameter (e.g., QP of the threshold iteration) is reconstructed. At operation 350, a reconstructed frame is compared to the corresponding raw frame to generate an associated KPI. For example, a perceived quality associated PSNR value is generated based on the difference between a frame encoded with a QP value that was determined to bring the eMOS up to the eMOS target for frames in the calibration structure. Method 301 then ends with output of the KPI value that is now associated with a particular perceived quality level.

Method 301 may be repeated for each change in perceived quality target. Method 301 may be repeated as needed in substantially real time. For a given scene, method 301 may be performed multiple times during a calibration phase to map a number of KPI values to a range of perceived quality targets spanning a minimum to maximum bitrate budget. For example, for a specific scene, a target PSNR of 40 dB may be mapped to a target eMOS of 4.5, a target PSNR of 30 dB may be mapped to a target eMOS of 4.0, and a target PSNR of 25 dB may be mapped to a target eMOS of 3.5 to cover a range of bitrate values which may be encountered as a result of variable network congestion. Method 301 may also be repeated for each scene change detected for the received video frames. Repeating method 301 for each scene change may advantageously improve correlation between the perceived quality level and the associated encoding KPI. Hence, a range of KPI values may be mapped to perceived quality levels with each scene change. Method 301 may also be repeated periodically to maintain a tight mapping between perceived quality levels and associated KPI values.

Figure 3B:
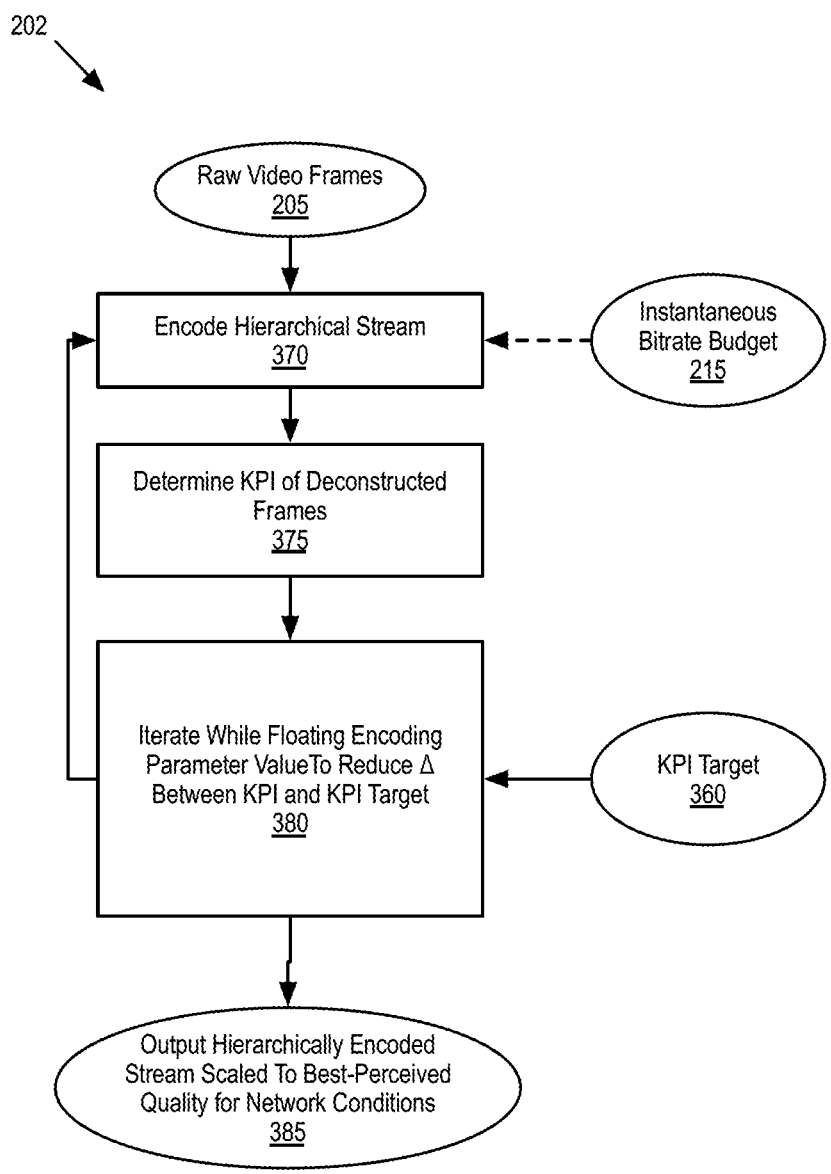
FIG. 3B is a flow diagram illustrating a method for generating a hierarchically encoded stream based on perceived quality.

In embodiments, frames of a base layer and frames of a hierarchically predicted enhancement layer are encoded with encoding parameter values determined based on the encoding KPI value associated with a particular perceived quality level target. For such embodiments, an eMOS estimate does not need to be recalculated for any particular scalable structure. FIG. 3B is a flow diagram illustrating a method 302 for generating a hierarchically encoded stream based on a perceived quality level. Method 302 may be performed for example as part of operation 230 in FIG. 2 and begins with receiving raw video frames at operation 205. At operation 370, a frame is encoded into a hierarchical stream structure. In an embodiment, the hierarchical structure constructed at operation 370 may be adapted in real time based on the instantaneous bitrate budget determined at operation 215. For such an embodiment, incoming candidate frames may be selected and encoded as independent key frames, or as dependent enhancement layer frames, or dropped. In alternative embodiments, all received frames are encoded into a predetermined hierarchical stream structure. At operation 375, a KPI of a deconstructed frame is determined At operation 380, the encode process is iterated while floating an encoding parameter to optimize that parameter on the basis of the KPI target that was determined to be associated with a particular perceived quality level target (e.g., eMOS) at operation 360 (FIG. 3A). As the encoding parameter is optimized for each frame on the basis of the perceived quality measure determined for the current bitrate, the hierarchically encoded stream output at operation 385 is scalable up to a best-perceived quality for the current network conditions and may be scaled down controllably to incrementally lower perceived quality levels in response to network congestion.

Figure 4A:
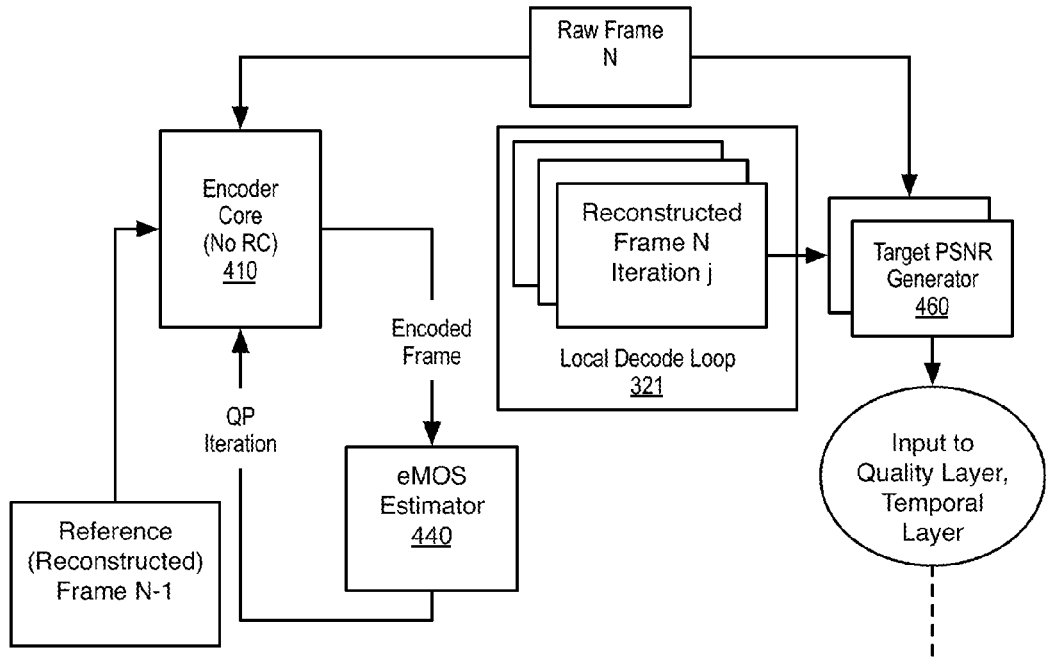
FIG. 4A is a data flow diagram further illustrating determination of a PSNR target in accordance with an exemplary embodiment.
Figure 4B:
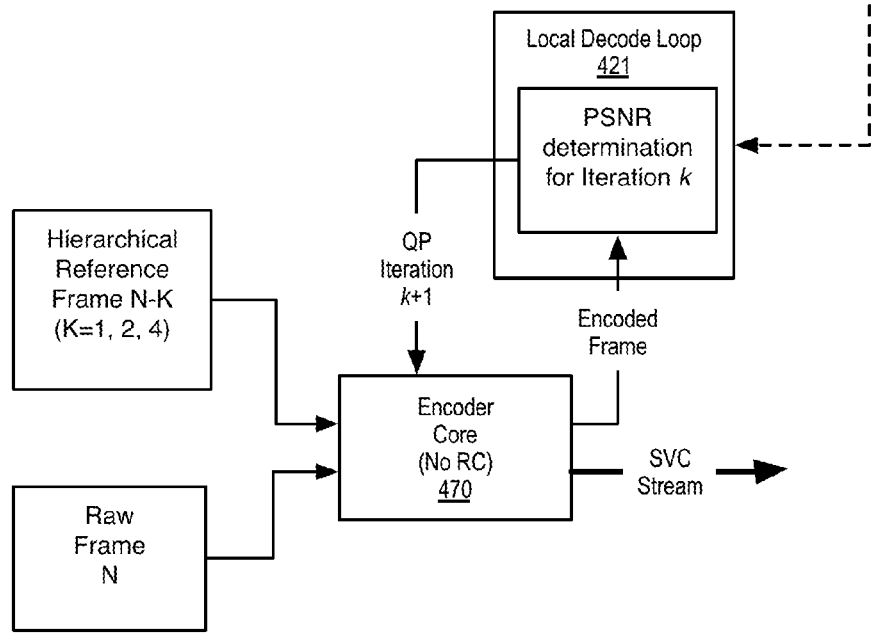
FIG. 4B is a data flow diagram further illustrating generation of a hierarchically encoded stream based on PSNR target, in accordance with an embodiment.

FIG. 4A is a data flow diagram further illustrating a full reference PEQV architecture for determining a PSNR target, in accordance with one embodiment of method 301. FIG. 4B is a data flow diagram further illustrating generation of a hierarchically encoded stream based on PSNR, in accordance with an embodiment of method 302. As shown in FIG. 4A, raw frame n and a reference frame n−1 is input into encoder 410, which operates in a "no rate control" mode. A perceived quality-based rate control loop includes eMOS estimator 440, which controls determination of a next QP iteration utilized by encoder 410. For each QP iteration j, a reconstructed frame n is generated in local decode loop 321. Reconstructed frame n and raw frame n are input into target PSNR generator 460, which outputs the PSNR value associated with the eMOS controlled encode process. This PSNR value is then to be used for KPI control of a multi-layered encode process.

As shown in FIG. 4B, raw frame n and hierarchical reference frame n−k are input into encoder 470, which is again operating without internal rate control. A KPI-based rate control loop controls the next QP iteration utilized by encoder 470. Local decode loop 421 generates a PSNR value for each QP iteration k. QP is thereby optimized for the frame on the basis of the last PSNR target received from target PSNR generator 460.

Figure 4C:
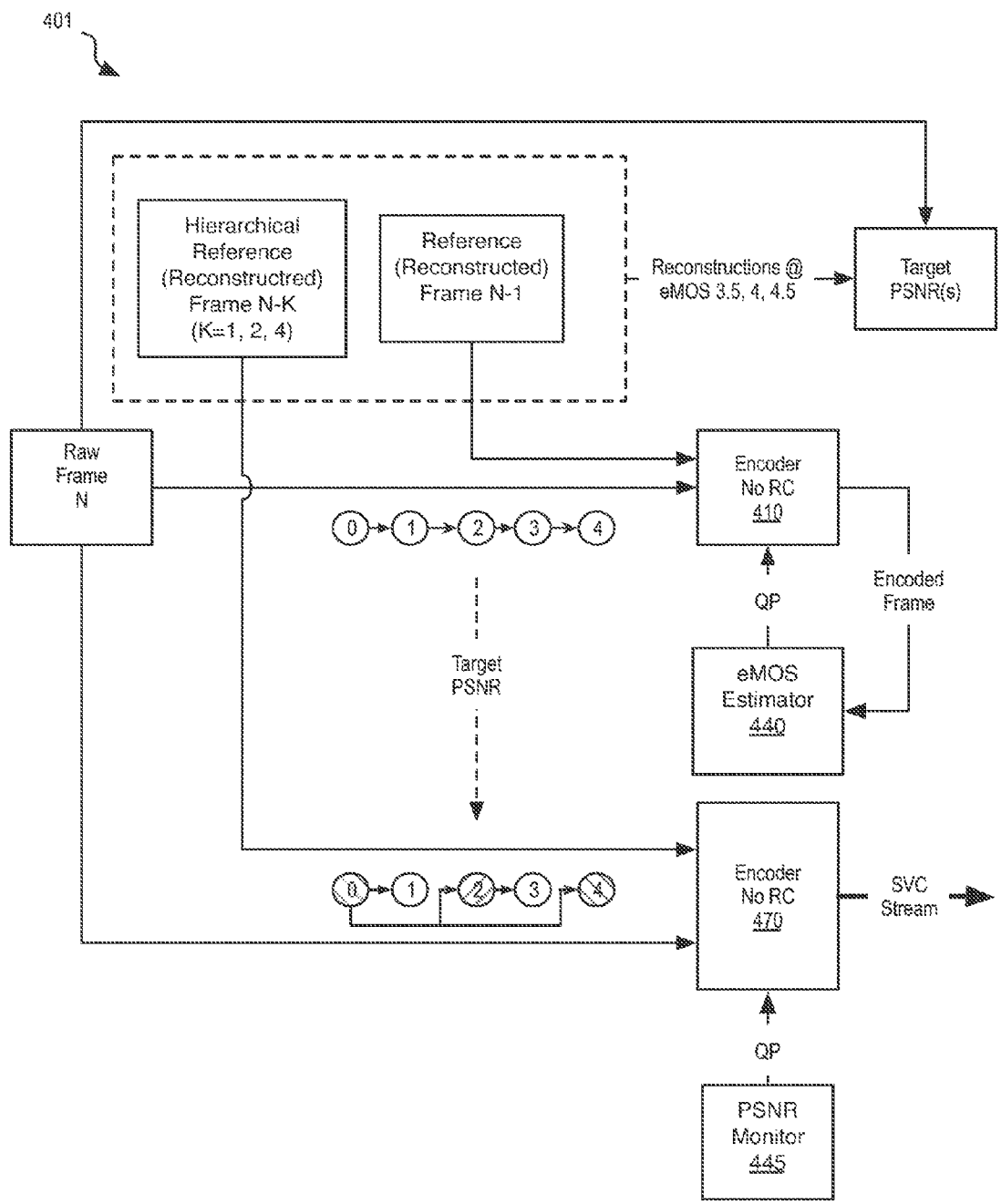
FIG. 4C is a functional block diagram further illustrating how a calibration non-hierarchically encoded stream is employed as a basis for rate control of a hierarchically encoded stream.

FIG. 4C is a functional block diagram further illustrating how a calibration non-hierarchically encoded stream is employed as a basis for rate control of a hierarchically encoded stream. As shown, system 401 includes the two encoders 410 and 470, the first configured to encode a stream suitable for perceived quality-based rate control (i.e., suitable for control by eMOS estimator 440). In the exemplary embodiment, the calibration structure is a single layer structure with no inter-layer prediction is utilized to encode frames 0, 1, 2, 3, and 4. An encoding KPI target (e.g., PSNR target) is generated from corresponding reconstructed reference frames. Encoder 470 utilizes the target KPI for hierarchically encoding frames 0, 1, 2, 3, 4, for example with frames 0 and 4 being key frames in a base layer, frame 2 being a first temporal enhancement layer frame dependent on frame 0, and frames 1 and 3 being second temporal enhancement layer frames dependent on frames 0 and 2, respectively.

As further illustrated by the dashed line box around, an encoding KPI target (e.g., PSNR) may be determined based on the reconstructed hierarchical reference frame n−k in addition, or in the alternative, to basing the KPI target determination on a reconstructed single-layer reference frame n−1. In embodiments, for example, a PSNR target is determined on frames in a highest temporal layer corresponding to the highest bitrate, which have a temporal reference distance equal to one frame. With the highest temporal enhancement layer satisfying the additional constraint that k is equal to 1, the eMOS estimator can be utilized to optimize QP of frames encoded into this layer. Once frames of the highest temporal enhancement layer are encoded to a target eMOS level, a difference analysis is performed on one or more frames to arrive at the associated target PSNR. For such embodiments, a range of KPI targets may be mapped to perceived quality levels without enlisting a non-hierarchical calibration structure.

Figure 5A:
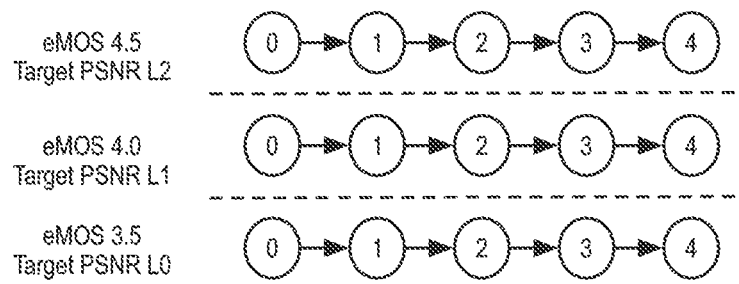
FIG. 5A illustrates a simulcast structure spanning a range of perceived qualities.
Figure 5B:
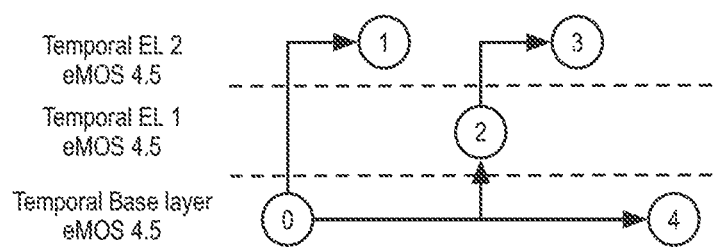
FIGS. 5B and 5C illustrate two hierarchical structures generated with perceived quality-based rate control, in accordance with embodiments.
Figure 5C:
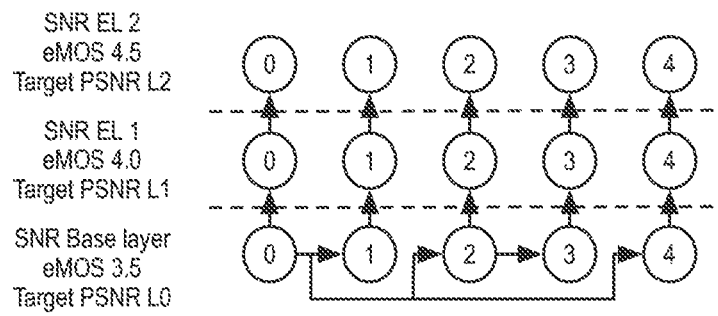

FIG. 5A illustrate a simulcast structure spanning a range of perceived qualities. FIGS. 5B and 5C illustrate two hierarchical structures generated with embodiments of the perceived quality-based rate control techniques described herein. The simulcast structure may be generated with eMOS-controlled encoding processes, for example employing the architecture illustrated in FIG. 1. Each single-layer stream is generated at a distinct perceived quality level (e.g., eMOSs of 3.5, 4.0, and 4.5). For each stream, an associated PSNR may be determined as described above, and for embodiments herein, these associated PSNR values may be utilized as targets for rate control and adaptation of hierarchical encoding structures. FIG. 5B illustrates one exemplary perceived quality guided hierarchical structure including a temporal base layer and two temporal enhancement layers, EL 1 and EL 2. Independent frames 0 and 4 are encoded to the temporal base layer at a predetermined perceived quality level (e.g. eMOS 4.5). Dependent frames 1, 2, and 3, although spanning multiple hierarchy levels, are also all encoded to the same predetermined perceived quality level, for example by employing the target PSNR value L2 associated with the single-level stream with the eMOS 4.5. FIG. 5C illustrates another perceived quality guided hierarchical structure having scalable quality (SNR) levels mapped to perceived quality levels. For this tempo-quality structure, each dependent enhancement quality level is mapped to a progressively higher perceived quality. In this exemplary embodiment, all frames encoded to the quality base layer employ a QP based on a PSNR of L0 associated with eMOS of 3.5. Frame quality is first upscaled by re-encoding additional refinement slices to achieve PSNR L1 associated with eMOS 4.0, and then upscaled further by re-encoding on the basis of PSNR L2.

Figure 6A:
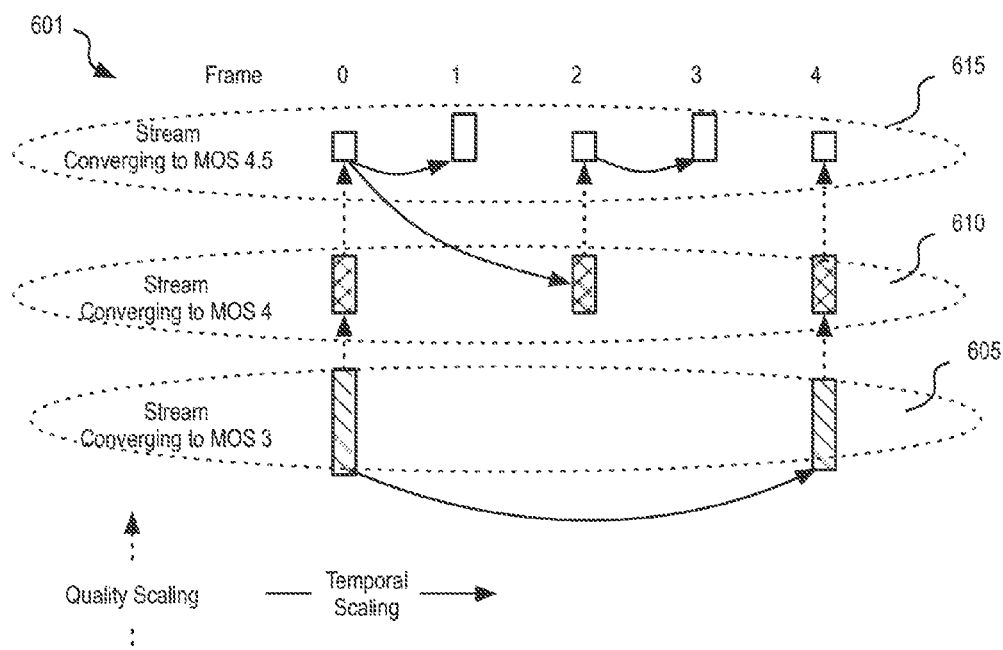
FIG. 6A illustrates an exemplary temporal-quality structure including three distinct scaled streams constructed based on perceived quality levels, in accordance with an embodiment.

FIG. 6A illustrates an exemplary temporal-quality structure 601 including three distinct scaled streams 605, 610, and 615 that are constructed in real time based on levels of perceived quality, in accordance with an embodiment. Streams 605, 610 and 615 are each associated with a distinct perceived quality level (eMOSs of 3.5, 4, and 4.5, respectively). Frames encoded to each stream are therefore encoded based on a KPI previously associated with the particular perceived quality level of the stream. For example, independent key frames 0 and 4 are encoded so to converge on a base layer perceived quality score of 3.5 using a PSNR that was determined by controlling QP based on an eMOS estimator. Quality SNR layers are similarly encoded to progressively higher perceived quality scores. Hence, key frames 0 and 4 are re-encoded to converge at eMOSs of 4 and 4.5 using appropriate PSNR values to guide the encoding parameters. For streams with temporal enhancement layers, dependent frames increasing temporal resolution may be encoded to the corresponding perceived quality score of the key frames in the stream.

In further embodiments, when a bitrate budget fails to satisfy a bitrate derived through a perceived quality rate controller targeting a certain perceived quality, the target perceived quality is reduced to avoid bitrate overflow. Hence the perceived quality-based rate controller may be adapted in real-time, thereby adapting the encoding rate in real-time (e.g., with each input frame). Adaptation may be either by modifying the hierarchical structure, and/or dropping segments of a quality-scaled stream, and/or by modifying the corresponding KPI target. In embodiments, perceived quality guided hierarchical structures are adapted in real time in response to variations in the instantaneous encoding bitrate budget. Because the structures are guided by perceived quality, effects of network congestion may impact a user's perceived level of quality more predictably than with non-perceived quality scaled streams.

Figure 6B:
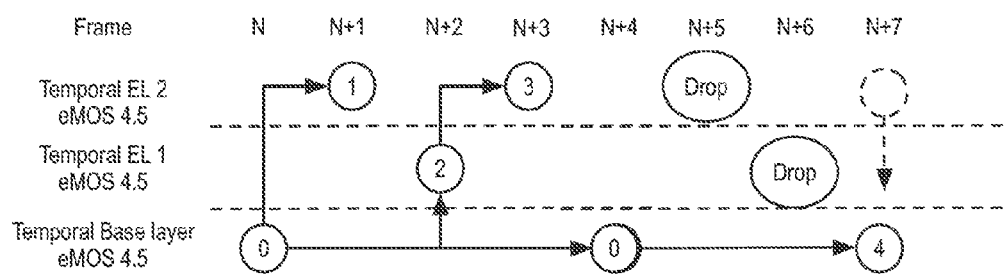
FIG. 6B illustrates a perceived quality-based hierarchical structure adaptation in response to network congestion, in accordance with an embodiment.

FIG. 6B illustrates an exemplary perceived quality-based hierarchical structure adaptation in response to network congestion. In this exemplary embodiment, an initial perceived quality based hierarchical structure has a temporal distance of four frames, frame N through N+4. The perceived quality levels associated with each dependent frame are as were described in the context of FIG. 5B. Upon detecting network congestion, frames N+5 and N+6 are dropped. Because frame N+7 was an enhancement dependent upon frame N+6 in the prior hierarchical structure, frame N+7 is demoted to base layer key frame and temporal distance therefore reduced to a distance of three from frame N+4.

Figure 7:
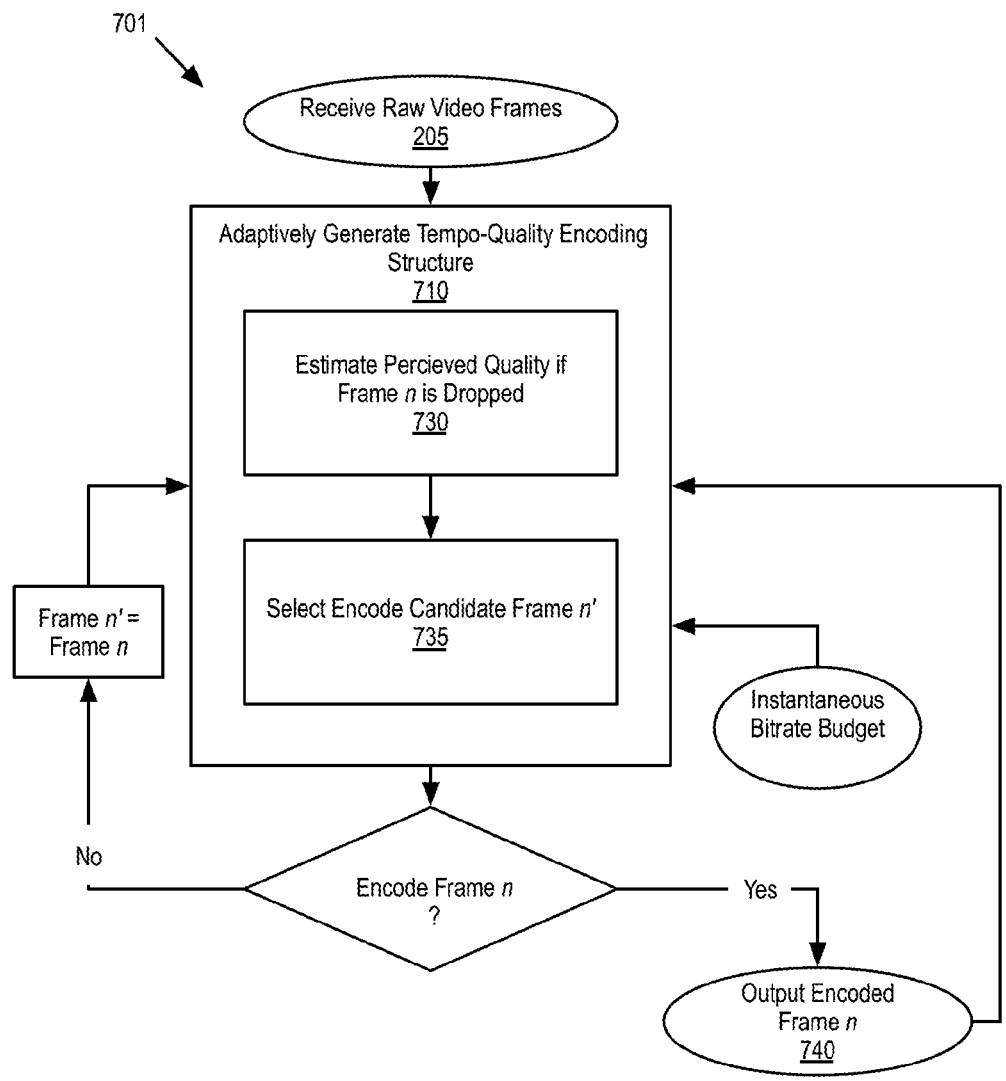
FIG. 7 illustrates a method for adapting a perceived quality guided hierarchical structure, in accordance with an embodiment.

FIG. 7 illustrates a method 701 for adapting a perceived quality guided hierarchical structure in accordance with an embodiment. Method 701 begins with receiving raw video frames at operation 205. At operation 710, a tempo-quality encoding structure is adaptively generated by estimating the perceived quality if a current frame n is dropped at operation 730. For example, if frame n is frame 1 or 3 in the exemplary tempo-quality structure in FIG. 6A, a drop can be estimated to maintain at least a perceived quality of 4.0. At operation 735, an encode candidate frame n' is selected based on the instantaneous bitrate budget. For example, if frame n is frame 1 in the tempo-quality structure in FIG. 6A, frame 1 may be dropped and frame 2 selected as the encode candidate frame n' to adapt the structure 601 from hierarchical streams which have a perceived quality of 4.5 for first, higher bitrate budget, to a perceived quality of 4.0 for a second, lower bitrate budget. The frames selectively encoded are output at operation 740 following the perceived quality-guided hierarchical encoding structure to generate a scaled bit stream having the best-perceived quality possible for the current network congestion.

In alternative embodiments, a perceived quality scaled structure is fixed and frames are always encoded with the same dependencies and to the same perceived quality level(s) regardless of network conditions and current bitrate budget. For such embodiments, adaptation of the perceived quality scaled structure occurs downstream of the encoder with frame drop occurring based on instantaneous bitrate budget and perceived quality score of any frame or hierarchical stream drop. For example, transfer units or network packets may be dropped to controllably scale the video transmission to a next lower (or higher) perceived quality. Because the structure is scaled as a function of perceived quality, perceived quality is predictably impacted as segments are dropped.

In embodiments, a KPI target is modified for a given incoming frame. The KPI target may be selected based on the instantaneous bitrate budget and the perceived quality score that will result from changing the KPI target for the current frame. For example, with a range of perceived quality scores mapped to PSNR targets for a given scene during a calibration phase, the PSNR target employed for controlling the encoding rate for the frame may be reduced or increased to the next increment in perceived quality level (above or below a prior quality level) as a function of the instantaneous bitrate. Alternatively, every input frame may be encoded to multiple KPI target values and one of a plurality of resulting hierarchically encoded streams is subsequently selected based on the instantaneous bitrate budget.

Figure 8A:
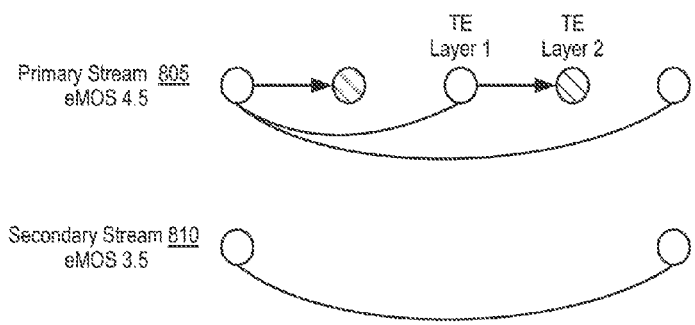
FIG. 8A illustrates an exemplary two-stream structure that may be constructed in real time for a best-perceived quality permitted by the current bitrate budget, in accordance with an embodiment.

In further embodiments, in addition to encoding a hierarchical stream as a primary video stream, a secondary non-hierarchically encoded video stream is also constructed and transmitted as a means to further improve video transmission resiliency. The secondary and primary streams may be simulcast with the secondary stream utilized by a remote decoder only in event of severe network congestion, for example that results is loss of a key frame of the primary stream. Both the primary and secondary encoded video streams may be perceived quality guided with the primary stream scalable over a range of perceived qualities above a lowest perceived quality threshold and a lowest bitrate of the single-layer secondary stream. FIG. 8A illustrates an exemplary two-stream structure that may be constructed in real time, frame-by-frame, to achieve a best perceived quality permitted by the current bitrate budget, in accordance with an embodiment. Frames in the primary stream 805 are encoded following a perceived quality-guided temporal hierarchical structure. For example, each base layer and enhancement layer frame in the primary bit stream is encoded with a QP that converges to a same eMOS (e.g., 4.5). Key frames included in the primary stream are further encoded into the independent single layer secondary bit stream 810 using a QP that converges to a lowest eMOS (e.g., 3.5). The perceived quality guided primary and secondary streams shown in FIG. 8A may be adapted in real-time as illustrated in FIG. 8B.

Figure 8B:
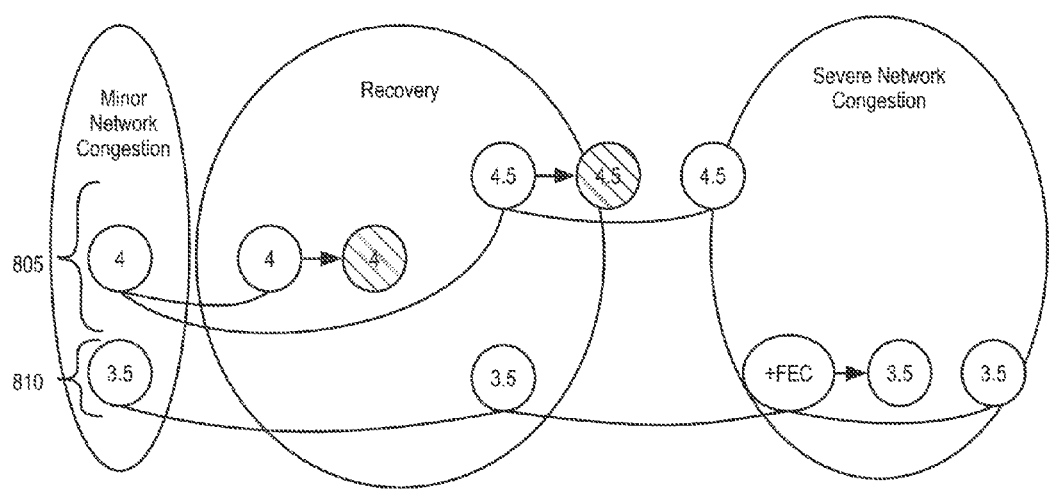
FIG. 8B illustrates adaptation of the two-stream structure illustrated in FIG. 8A in response to network congestion, in accordance with embodiments.

In FIG. 8B, the hierarchical structure of primary bit stream 805 may be modified in response to network congestion, for example by changing the number of temporal enhancement layers, and/or increasing/decreasing frame temporal/spatial/quality layer level, and/or changing the KPI target employed for encoding frames of a base layer and any temporal enhancement layers. Beginning with the current bitrate budget satisfying some threshold, the primary stream is built from frames encoded with QP values targeting a KPI associated with a highest perceived quality target (e.g., an eMOS of 4.5). In response to a congestion monitor detecting minor network congestion that reduces the instantaneous encoding bitrate budget below a threshold, the perceived quality-controlled encoding rate is reduced to a lower perceived quality target. Frames associated with the highest quality enhancement layer may then be dropped and a candidate frame encoded to a new, reduced PSNR target that was previously mapped to a next lower perceived quality level. For example, a key frame may be iteratively re-coded beyond a base quality layer to achieve a PSNR target associated with an eMOS of 4 rather than 4.5. A candidate frame for a highest temporal enhancement layer associated with an eMOS over 4 (e.g., 4.5) is also dropped, reducing bitrate for the new perceived quality level. In response to detecting a network recovery, the highest temporal enhancement layer is added by encoding a candidate frame to the current perceived quality level (e.g., eMOS of 4). For the next key frame, the highest quality enhancement layer is added by iteratively re-coding the frame beyond the base quality layer to again achieve the PSNR associated with the eMOS of 4.5. The highest temporal enhancement layer is then maintained at this highest perceived quality level by encoding an additional dependent frame with this same target PSNR.

Upon detecting more severe network congestion reducing the bitrate budget further, primary bit stream 805 is dropped and the secondary bit stream 810 is relied upon to transmit key frames encoded at a rate that sustains a lowest perceived quality level (e.g., 3.5). In further embodiments, the secondary stream includes an error recovery sequence instead of a duplicate key frame. For example, a single forward error correction (e.g., XOR) packet may be sent for a key frame instead of resending the key frame. Thus, a structure change may entail changes to either or both the primary and secondary streams as a function of current bitrate. Where the bit rate budget falls for example, the primary stream bitrate may be reduced by rate controlling to a lower perceived quality target and the secondary stream bitrate may be reduced by changing from a duplicate key frame transmission to transmission of a key frame error recovery sequence.

Figure 9:
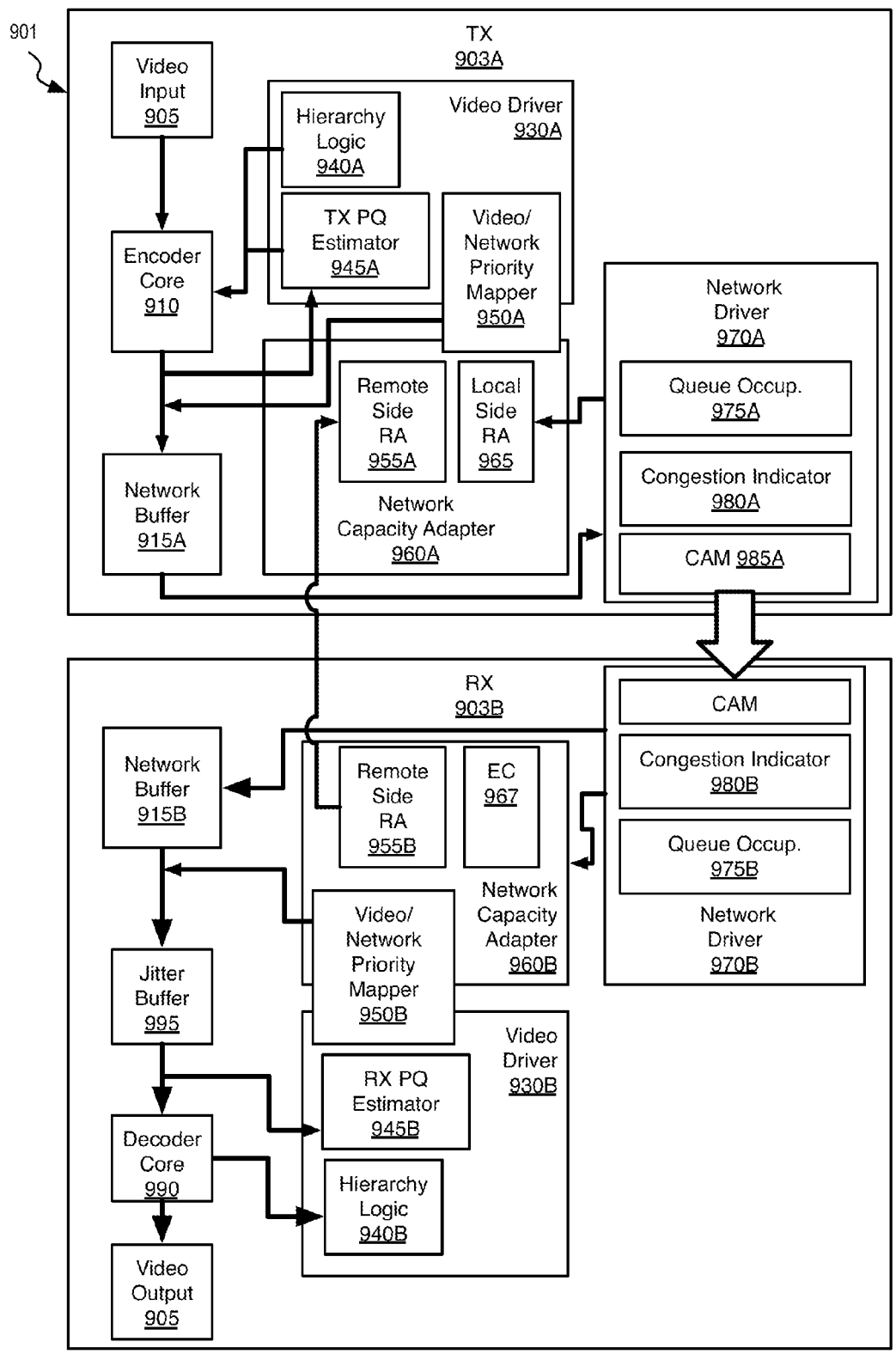
FIG. 9 is a functional block diagram illustrating a networked communication system configured for perceived quality-guided video encoding rate adaptation in conformance with one or more embodiments.

FIG. 9 is a functional block diagram illustrating a networked communication system 901 configured for perceived quality guided video encoding rate adaptation in conformance with one or more embodiments described elsewhere herein. System 901 includes a transmit (TX) device 903A remote from a receive (RX) device 903B. Transmit device 903A and receive device 903B may be communicatively coupled over any conventional network as embodiments are not limited in this respect. In exemplary applications, transmit device 903A may be a video capture platform and/or a streaming server platform, while receive device 903B is a video streaming client platform. In other applications, transmit device 903A and receive device 903B are video conferencing devices each having the illustrated video capture and streaming server/client capabilities.

In an embodiment, device 903A is configured for perceived quality-based video capture. Device 903A includes video input 905 to receive captured video frames. Encoder core 910 is coupled to video input 905 and outputs an encoded stream following a particular encoding specification (e.g., H.265, etc.). Device 903A further includes video driver 930A, which implements hierarchy logic 940A and a video perceived quality (PQ) estimator 945A. PQ estimator 945A is to estimate perceived quality of a stream output from encoder core 910, for example generating an eMOS for a calibration structure or top temporal enhancement layer, as described elsewhere herein. In the exemplary embodiment, PQ estimator 945A is further coupled to encoder core 910 to control one or more encoding parameters (e.g., QP) to achieve a target perceived quality level for the captured/stored video. Hierarchy logic 940A is to associate encoding KPI values to various perceived video quality levels determined by PQ estimator 945A. In further embodiments, hierarchy logic 940A is to control encoder core 910 so as to encode input video frames into a PQ-guided scalable structure in conformance with one or more of the techniques described herein. Device 903A further includes application 920A, through which a user may specify a target perceived quality level and/or select a perceived-quality guided video encoding rate control mode that modifies operation of encoder core 910 in conformance with one or more embodiments described elsewhere herein.

In an embodiment, device 903A is further configured for perceived quality-based video transmission. For such embodiments, device 903A includes network capacity adapter 960A and network driver 970A. Capacity adapter 960A includes a remote side rate adapter (RA) 955A and a local side rate adapter 965. Local side RA 965 receives network status updates from network driver 670A, for example pertaining to transmission queue occupancy 975A, and/or network congestion monitor 980A. Remote side RA 955A may interface with remote side RA 955B disposed in receive device 903B, forming an end-to-end (E2E) control loop, for example through a network side channel. In embodiments, outputs from either remote side RA 955A or local side RA 965 are coupled into hierarchy logic 940A, which is further configured to control encoder core 910 to adapt the hierarchical structure of the PQ-guided scalable video bit stream in real-time (e.g., on a frame-by-frame basis) in response to network congestion determined based on inputs from RA 955A, 965. Encoded video streams are encapsulated into network abstraction layer (NAL) units, which are prioritized by video/network priority mapper 950A. In certain embodiments where a hierarchical video stream has a fixed structure that includes layers exceeding the current bitrate budget, NAL units may also be dropped by video/network priority mapper 950A based on outputs of RA 955A, 965. The NAL units are stored in the network buffer 915A and then transmitted over the network to device 903B as defined by routing information and radio parameters controlled by connection access manager 985A.

In certain embodiments, connection access manager 985A is a cognitive radio configured to dynamically modify radio parameters based on local and/or remote perceived video quality score. In one example, connection access manager 985A may dynamically change a path the video stream transmission message take to deliver the video stream to receive device 903B. In a second example, connection access manager 985A may dynamically change a frequency band employed by the radio to transmit the video stream. In a third example, connection access manager 985A may dynamically change a protocol employed by the radio to transmit the video stream.

For receive device 903B, NAL units are stored in a memory, such as network buffer 915B. Priority mapper 950B is to extract the perceived quality guided video bit stream and identifies frames as received or not received. RX perceived quality (PQ) estimator 945B is to generate a remote NR perceived quality estimate of the received video stream, for example generating an eMOS estimate substantially as described above in the context of FIG. 1. In remote video perceived quality control embodiments, RX PQ estimator 945B may output a remote encoding rate control signal (e.g., including or based on an encoding parameter such as QP determined by PX PQ estimator 945B). The remote encoding rate control signal may then be transmitted between remote side RA 955B and RA 955A. A received remote video perceived quality control signal is then input into video driver 930A to change the video perceived quality target, an associated encoding KPI (e.g., PSNR) target, and/or to adapt the hierarchical structure of the video stream. Payload data and scaling information for the video is received by video decoder core 990 and receive-side hierarchy logic 940B. Decoder core circuitry 990 implements an SVC standard compliant decoder (e.g., H.265, etc.), and is to decode frames output by jitter buffer 995. Hierarchy logic circuitry 940B is coupled to decoder core 990 and/or jitter buffer 995, and is to determine a response to any lost or delayed video frame or segment based on the hierarchy information contained in the bit stream metadata. In one such embodiment, hierarchy logic 940B is to coordinate decoding of received primary and secondary bit streams to maintain a highest possible video perceived quality level. For bit streams 805 and 810 illustrated in FIG. 8B for example, hierarchy logic 940B may combine data from the primary and secondary bit streams, replacing a key frame lost form the primary stream with a duplicate key frame decoded from the secondary stream. Alternatively, in response to a lost/late frame in the primary stream, hierarchy logic 940B may process forward error correction (e.g., XOR) packets received in the secondary bit stream through error correction circuitry 967 to correct bits received in the primary bit stream. Hierarchy logic 940B may further initiate a request to retransmit a lost/late frame, or may initiate a change in the video stream hierarchical structure utilized by transmit device 903A. Such a request may be transmitted over any radio channel, for example between remote side RA 955B and RA 955A. Receive device 903B further includes congestion indicator 980B and queue occupancy monitor 975B, which may function in an manner analogous with congestion indicator 980A and queue occupancy monitor 975A to initiate a remote video encoding rate adjustment. Video frames output from decoder core 990 are processed for display, for example terminating at video output 905.

Figure 10:
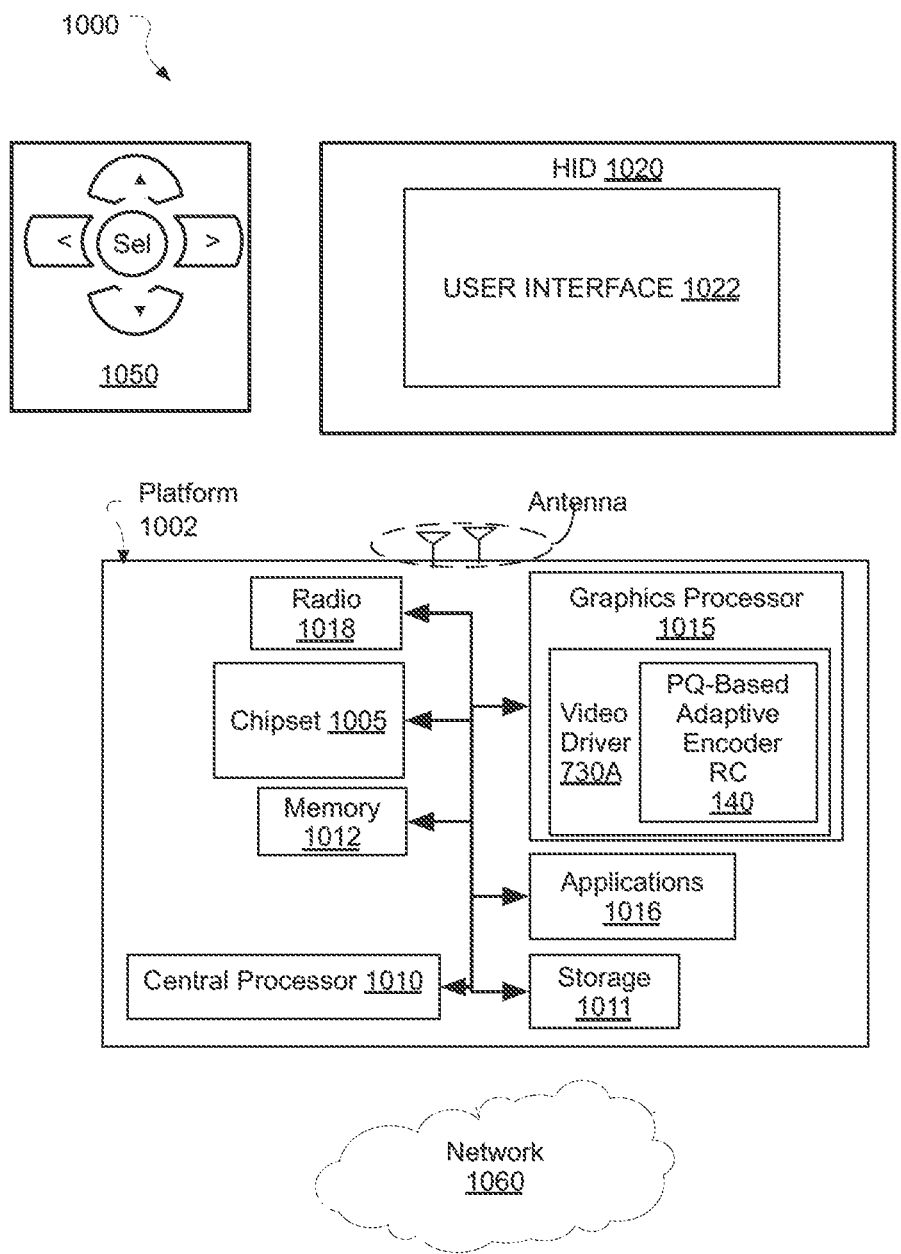
FIG. 10 is a diagram of an exemplary system, in accordance with an embodiment.

FIG. 10 is an illustrative diagram of an exemplary system 1000, in accordance with embodiments. System 1000 may implement all or a subset of the various functional blocks depicted in FIG. 10. For example, in one embodiment a graphics processor 1015 implements a graphics processing system that includes the perceived quality-based adaptive hierarchical encoder rate controller 140 as was described in FIG. 9, for example having one or more of the features described elsewhere herein to perform any of the methods and/or functions described in the context of FIGS. 1-9. In one specific exemplary embodiment, graphics processor 1015 includes fixed-function and/or programmable logic circuitry (e.g., within at least one execution unit (EU), or shader core) to perform perceived quality-based adaptive rate control of a hardware accelerated hierarchical stream encoder, and/or perform selective adaptation of a multi-layered encoding structure, and/or perform selective adaptation of an KPI target to which a hardware accelerated encoder is controlled. System 1000 may be a mobile device although system 1000 is not limited to this context. For example, system 1000 may be incorporated into a laptop computer, ultra-laptop computer, tablet, touch pad, portable computer, handheld computer, palmtop computer, cellular telephone, smart device (e.g., smart phone, smart tablet or mobile television), mobile internet device (MID), messaging device, data communication device, and so forth. System 1000 may also be an infrastructure device. For example, system 1000 may be incorporated into a large format television, set-top box, desktop computer, or other home or commercial network device.

In various implementations, system 1000 includes a platform 1002 coupled to a HID 1020. Platform 1002 may receive captured personal media data from a personal media data services device(s) 1030, a personal media data delivery device(s) 1040, or other similar content source. A navigation controller 1050 including one or more navigation features may be used to interact with, for example, platform 1002 and/or HID 1020. Each of these components is described in greater detail below.

In various implementations, platform 1002 may include any combination of a chipset 1005, processor 1010, memory 1012, storage 1014, graphics processor 1015, applications 1016 and/or radio 1018. Chipset 1005 may provide intercommunication among processor 1010, memory 1012, storage 1014, graphics processor 1015, applications 1016, or radio 1018. For example, chipset 1005 may include a storage adapter (not depicted) capable of providing intercommunication with storage 1014.

Processor 1010 may be implemented as one or more Complex Instruction Set Computer (CISC) or Reduced Instruction Set Computer (RISC) processors; x86 instruction set compatible processors, multi-core, or any other microprocessor or central processing unit (CPU). In various implementations, processor 1010 may be a multi-core processor(s), multi-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Graphics processor 1015 may perform processing of images such as still or video media data for display, or perform general computing functions in a highly parallel manner. Graphics processor 1015 may include one or more GPU, or visual processing unit (VPU), for example. An analog or digital interface may be used to communicatively couple graphics processor 1015 and display 1020. For example, the interface may be any of a High-Definition Multimedia Interface, Display Port, wireless HDMI, and/or wireless HD compliant techniques. Graphics processor 1015 may be integrated with central processor 1010 onto a single chip (i.e., SoC) as a graphics core or provided as part of chipset 1005. In some implementations, graphics processor 1015 may be a stand-alone card communicatively coupled to chipset 1005. In various exemplary embodiments, graphics processor 1015 and/or central processor 1010 invokes or otherwise implements perceived quality-based adaptive rate control of multi-layered encoding, for example as described elsewhere herein.

The perceived quality-based adaptive rate control of multi-layered encoding predicated upon adaptation of hierarchical structures and/or frame encoding parameters to maximize perceived quality for an instantaneous bitrate budget as described herein may be implemented in various hardware architectures, cell designs, or "IP cores." As still another embodiment, the methods and functions described herein in the context of graphics processor may be extended to a general-purpose processor, including a multi-core processor. In further embodiments, the methods and functions may be implemented in a purpose-built consumer electronics device, such as a game console processor.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, HID 1020 may include any television type monitor or display. HID 1020 may include, for example, a computer display screen, touch screen display, video monitor, television-like device, and/or a television. HID 1020 may be digital and/or analog. In various implementations, HID 1020 may be a holographic display. Also, HID 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on HID 1020.

In various implementations, platform 1002 may receive control signals from navigation controller 1050 having one or more navigation features. The navigation features of controller 1050 may be used to interact with user interface 1022, for example. In embodiments, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1050 may be replicated on a display (e.g., HID 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In embodiments, controller 1050 may not be a separate component but may be integrated into platform 1002 and/or HID 1020. The present disclosure, however, is not limited to the elements or in the context shown or described herein.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Figure 11:
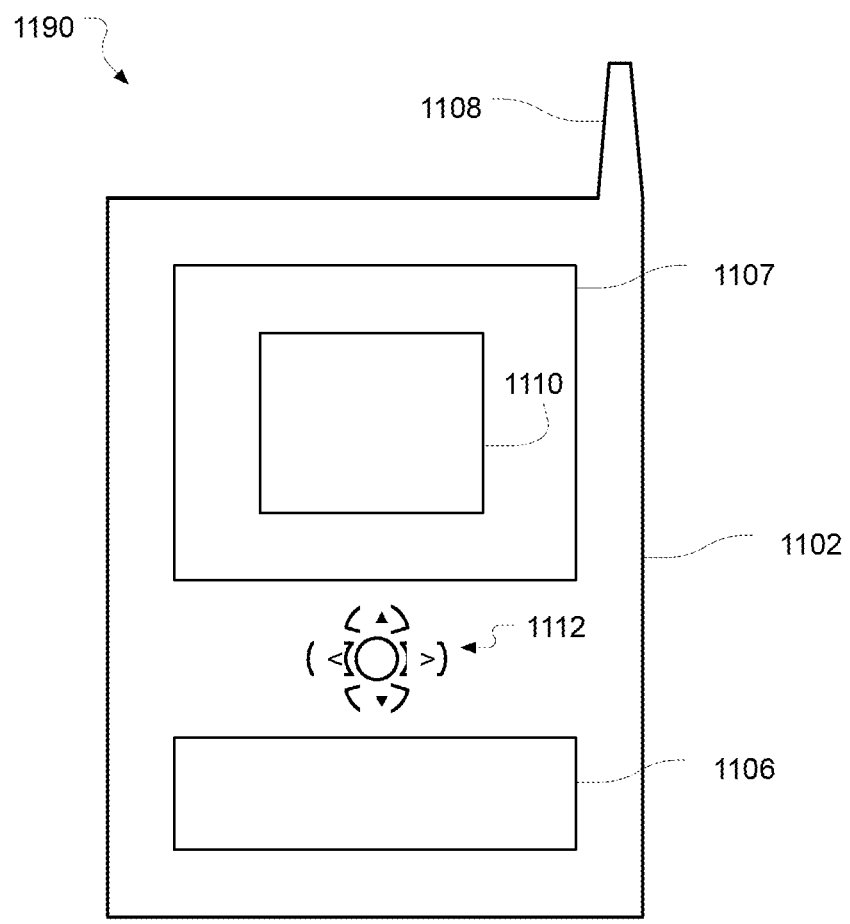
FIG. 11 is a diagram of an exemplary system, arranged in accordance with an embodiment.

As described above, system 1000 may be embodied in varying physical styles or form factors. FIG. 11 illustrates embodiments of a small form factor device 1100 in which system 1100 may be embodied. In embodiments, for example, device 1100 may be implemented as a mobile computing device having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smartphone, tablet or smart television), mobile internet device (MID), messaging device, data communication device, and so forth.

Examples of a mobile computing device also may include computers and/or media capture/transmission devices configured to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 11, device 1100 may include a housing 1102, a display 1104, an input/output (I/O) device 1106, and an antenna 1108. Device 1100 also may include navigation features 1112. Display 1104 may include any suitable display unit for displaying information appropriate for a mobile computing device. I/O device 1206 may include any suitable I/O device for entering information into a mobile computing device. Examples for I/O device 1106 may include an alphanumeric keyboard, a numeric keypad, a touch pad, input keys, buttons, switches, microphones, speakers, voice recognition device and software, and so forth. Information also may be entered into device 1100 by way of microphone (not shown), and may be processed by a voice recognition device. Embodiments are not limited in this context.

Various embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, data words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Programmable logic circuitry may have registers, state machines, etc. configured by the processor implementing the computer readable media. Such logic circuitry, as programmed, may then be understood to have been physically transformed into a system falling within the scope of the embodiments described herein. Instructions representing various logic within the processor, which when read by a machine may also cause the machine to fabricate logic adhering to the architectures described herein and/or to perform the techniques described herein.

Such representations, known as cell designs, or IP cores, may be stored on a tangible, machine-readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to be within the spirit and scope of the present disclosure.

The following examples pertain to particular exemplary embodiments.

In one or more first embodiment, a computer-implemented scalable video coding (SVC) method includes receiving raw video frames, and encoding the frames into a hierarchical stream using encoding parameter values determined based on an encoding key performance index (KPI) target associated with a perceived quality level target assigned to each layer of the hierarchical stream. The hierarchical stream is then stored in a memory.

In furtherance of the one or more first embodiment, the method further includes adapting the encoding of the hierarchical stream to change the perceived quality level in response to network congestion by dropping a temporal enhancement layer or encoding frames of any remaining temporal enhancement layer at a reduced KPI target.

In furtherance of the one or more first embodiment, the method further includes adapting the encoding of the hierarchical stream to change the perceived quality level in response to network congestion by changing in a frame temporal, spatial, or quality layer level within the hierarchical structure.

In furtherance of the one or more first embodiment, the method further includes determining, for frames in a non-hierarchical structure, an encoding parameter value corresponding to a predetermined perceived quality level target by floating the encoding parameter and iteratively encoding the frames until the predetermined perceived quality level target is achieved. The method further includes reconstructing a frame from data encoded with the encoding parameter value, generating, based on a difference between the reconstructed frame and the corresponding raw frame, the KPI target associated with the predetermined perceived quality level target.

In furtherance of the one or more first embodiment, the perceived quality level target comprises an estimated mean opinion score (eMOS), and the encoding parameter is a quantization parameter (QP). The KPI target is a peak signal-to-noise ratio (PSNR), and the same target PSNR value is employed for encoding frames in any layer of the hierarchical stream associated with the same eMOS.

In furtherance of the one or more first embodiment, the method further includes determining a current bitrate budget. Encoding the frames into the hierarchical stream further comprises encoding frames of a base layer and frames of a hierarchically predicted enhancement layer with encoding parameter values determined based on a first KPI target associated with a first perceived quality target in response to the current bitrate budget satisfying a threshold. Encoding the frames into the hierarchical stream further comprises encoding frames of the base layer and frames of the hierarchically predicted enhancement layer with encoding parameter values determined based on a second KPI target associated with a second perceived quality target, lower than the first perceived quality target, in response to the current bitrate budget failing to satisfy the threshold.

In furtherance of the one or more first embodiment, the method further includes determining, for frames in a non-hierarchical structure, a first encoding parameter value corresponding to the first perceived quality target by floating the first encoding parameter and iteratively encoding the frames until the first perceived quality target is achieved. The method further includes reconstructing a frame from data encoded with the first encoding parameter value.

The method further includes generating, based on a difference between the reconstructed frame and the corresponding raw frame, the first KPI target associated with the first perceived quality target. The method further includes determining, for frames in the non-hierarchical structure, a second encoding parameter value corresponding to the second perceived quality target by floating the second encoding parameter and iteratively encoding the frames until the second perceived quality target is achieved. The method further includes reconstructing a frame from data encoded with the second encoding parameter value. The method further includes generating, based on a difference between the reconstructed frame and the corresponding raw frame, the second KPI target associated with the second perceived quality target.

In furtherance of the above embodiment, the method further includes encoding the base layer frames with encoding parameter values determined based on a first KPI target further comprises iteratively encoding key frames while floating the encoding parameter value until the first KPI target is achieved. Encoding the enhancement layer frames with the first encoding parameter values further comprises iteratively encoding one or more frame dependent upon the key frames while floating the encoding parameter value until the first KPI target is achieved.

In furtherance of the one or more first embodiment, the method further includes constructing a primary encoded video stream comprising the hierarchical stream, and constructing a secondary encoded video stream associated with a lowest perceived quality and a lowest bitrate. In further embodiments, encoding the frames into the hierarchical stream, further comprises encoding the frames into a first hierarchical stream by encoding frames of a first base layer and frames of a first hierarchically predicted enhancement layer with encoding parameter values determined based on a first KPI target associated with a highest perceived quality target. In further embodiments, the method further comprises encoding the frames into a second hierarchical stream by encoding frames of a second base layer and frames of a second hierarchically predicted enhancement layer with encoding parameter values determined based on a second KPI target associated with a lower perceived quality target. The method further comprises determining a current bitrate budget, and constructing the primary encoded video stream from the first or second hierarchical stream associated with the best-perceived quality permitted by the current bitrate budget.

In furtherance of the above embodiment, encoding the frames into the hierarchical stream further comprises encoding the frames into a first hierarchical stream by encoding frames of a first base layer and frames of a first hierarchically predicted enhancement layer with encoding parameter values determined based on a first KPI target associated with a highest perceived quality target. Constructing the secondary stream further comprises resending a key frame of the first hierarchical stream. In response to a bitrate budget reduction, the method further comprises encoding the frames into a second hierarchical stream by encoding frames of a second base layer and frames of a second hierarchically predicted enhancement layer with encoding parameter values determined based on a second KPI target associated with a lower perceived quality target, in which case constructing the secondary stream comprises sending an error recovery sequence for a key frame of the second hierarchical stream.

In one or more second embodiment, a scalable video encoder includes a video input to receive raw video frames and hierarchy logic to associate an encoding key performance indicator (KPI) with a target perceived video quality level. The scalable video encoder further includes an encoder core coupled to the video input to encode the frames into a hierarchical stream having the target perceived quality by using encoding parameter values determined based on a KPI. The scalable video encoder further includes a memory to store the hierarchical stream.

In furtherance of the one or more second embodiment, the scalable video encoder further includes a perceived quality estimator to estimate perceived quality of a stream output from the encoder core by generating an estimated mean opinion score (eMOS) for a calibration structure or for a top temporal enhancement layer of the hierarchical stream.

In furtherance of the one or more second embodiment, the hierarchy logic is control the encoder core to change a video perceived quality level of the hierarchical stream in response to network congestion by dropping a temporal enhancement layer or encoding frames of any remaining temporal enhancement layer at a reduced KPI target.

In one or more third embodiment, the scalable video decoder includes a buffer to receive a bit stream having a perceived quality-guided temporal hierarchical structure, and a decoder core coupled to the buffer to decode the bit stream into video frames. The scalable video decoder further includes hierarchy logic circuitry coupled to the decoder core or buffer to determine a response to a lost or delayed video frame based on hierarchy information contained in the bit stream.

In furtherance of the one or more third embodiment, the scalable video decoder includes a perceived quality estimator coupled to the buffer or the decoder core to generate a no-reference perceived quality estimate of the video frames and to output a remote encoding rate control signal, or an encoding parameter.

In furtherance of the one or more third embodiment, the buffer is to receive a primary bit stream having a perceived quality-guided temporal hierarchical structure. The buffer is to also receive a secondary bit stream having a single-layer structure associated with a lower perceived quality than the primary bit stream. The hierarchy logic circuitry is to replace a key frame lost from the primary stream with a duplicate key frame decoded from the secondary stream.

In furtherance of the one or more third embodiment, the hierarchy logic circuitry is further to process forward error correction packets in the secondary bit stream through error correction circuitry and to correct bits received in the primary stream. In furtherance of the one or more second embodiment, the hierarchy logic circuitry is further to initiate a request to retransmit a lost or late video frame.

In one or more fourth embodiment a networked communication system includes a transmit device and a receive device. The transmit device includes a scalable video encoder and a remote-side rate adapter. The scalable video encoder further includes a video input to receive video frames. The scalable video encoder further includes hierarchy logic circuitry to associate an encoding key performance indicator (KPI) with a target perceived video quality level. The scalable video encoder further includes an encoder core coupled to the video input to encode the frames into a hierarchical stream having the target perceived quality by using encoding parameter values determined based on the KPI. The remote-side rate adapter is coupled to the hierarchy logic circuitry, and is to cause a change in the target perceived quality or associated KPI in response to receiving a remote encoding rate control signal. The receive device includes a buffer to receive the hierarchical stream, and a decoder core coupled to the buffer to decode the hierarchical stream into video frames. The receive device further includes a perceived quality estimator coupled to the buffer or the decoder core to generate a no-reference perceived quality estimate of the video frames and to output the remote encoding rate control signal to the remote-side rate adapter.

In furtherance of the one or more fourth embodiment, the transmit device further comprises a cognitive radio configured to dynamically modify radio parameters based on the target perceived quality or the no-reference perceived quality estimate.

In furtherance of the one or more fourth embodiment, the receive device further comprises hierarchy logic circuitry coupled to the decoder core or buffer to determine a response to a lost or delayed video frame based on hierarchy information contained in the bit stream. In one or more fifth embodiment, one or more computer-readable medium, storing instructions thereon, which when executed by a computer processor, cause the processor to perform any of the one or more first embodiments.

In one or more sixth embodiment, a scalable video encoder includes a receiving means to receive raw video frames, and a perceived quality mapping means to associate an encoding key performance indicator (KPI) with a target perceived video quality level. The scalable video encoder further includes an encoding means coupled to the receiving means to encode the frames into a hierarchical stream having the target perceived quality by using encoding parameter values determined based on a KPI. The scalable video encoder further includes a storage means to store the hierarchical stream.

In one or more seventh embodiment, a scalable video decoder includes a storage means to receive a bit stream having a perceived quality-guided temporal hierarchical structure, and a decoding means coupled to the storage means to decode the bit stream into video frames. The scalable video decoder further includes a controlling means coupled to the decoder core or buffer to determine a response to a lost or delayed video frame based on hierarchy information contained in the bit stream.

It will be recognized that the embodiments are not limited to the exemplary embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. Scope should, therefore, be determined with reference to the appended claims, along with the full scope of equivalents to which such claims are entitled.

What is claimed is:

1. A computer-implemented scalable video coding (SVC) method, comprising:
   receiving raw video frames;
   determining, for first frames encoded into a non-hierarchical calibration structure comprising a single layer stream of a predetermined constant frame rate, an encoding quantization parameter (QP) value corresponding to a predetermined perceived quality level target by floating the QP value and iteratively encoding the first frames until the predetermined perceived quality level target is achieved for a given bitrate budget;
   generating a reconstructed frame from data encoded with the QP value that achieves the perceived quality level target;
   determining, based on a difference between the reconstructed frame and a corresponding raw frame, a calibration peak signal-to-noise ratio (PSNR) target associated with the perceived quality level target;
   encoding second frames into a hierarchical stream including a base layer and one or more temporal or quality enhancement layers using QP values determined for each layer based on the PSNR target determined from the calibration structure to correspond with a perceived quality level target assigned to each layer of the hierarchical stream; and
   storing the hierarchical stream in a memory.

2. The method of claim 1, further comprising
   adapting the encoding of the hierarchical stream to change the perceived quality level to a next lower perceived quality target in response to network congestion by dropping a temporal enhancement layer or encoding frames of any remaining temporal enhancement layer at a reduced PSNR target that was mapped for the calibration structure to the next lower perceived quality level target.

3. The method of claim 1, further comprising:
   adapting the encoding of the hierarchical stream to change the perceived quality level in response to network congestion by periodically generating the (PSNR) targets associated with predetermined perceived quality level targets for each of a plurality of scenes detected in the received video frames.

4. The method of claim 1, wherein:
   the perceived quality level target comprises an estimated mean opinion score (eMOS); and
   the same target PSNR value is employed for encoding frames in any layer of the hierarchical stream assigned the same eMOS.

5. The method of claim 1, further comprising determining a current bitrate budget; and
   wherein encoding the frames into the hierarchical stream, further comprises:
      encoding, in response to the current bitrate budget satisfying a threshold, frames of the base layer and frames of a hierarchically predicted enhancement layer with QP values determined based on a first PSNR target that was mapped for the calibration structure to a first perceived quality target; and
      encoding, in response to the current bitrate budget failing to satisfy the threshold, frames of the base layer and frames of the hierarchically predicted enhancement layer with QP values determined based on a second PSNR target that was mapped for the calibration structure to a second perceived quality target, lower than the first perceived quality target.

6. The method of claim 5, further comprising:
determining, for frames encoded into the calibration structure, a first QP value corresponding to the first perceived quality target by floating the first QP value and iteratively encoding the frames until the first perceived quality target is achieved at the threshold bitrate budget;
reconstructing a frame from data encoded with the first QP value;
generating, based on a difference between the reconstructed frame and the corresponding raw frame, the first PSNR target associated with the first perceived quality target;
determining, for frames encoded into the calibration structure, a second QP value corresponding to the second perceived quality target by floating the second QP value and iteratively encoding the frames until the second perceived quality target is achieved;
reconstructing a frame from data encoded with the second QP value; and
generating, based on a difference between the reconstructed frame and the corresponding raw frame, the second PSNR target associated with the second perceived quality target.

7. The method of claim 5, wherein:
encoding the base layer frames with QP values determined based on a first PSNR target further comprises iteratively encoding key frames while floating the encoding parameter value until the first PSNR target is achieved; and
encoding the enhancement layer frames with the first QP values further comprises iteratively encoding one or more frame dependent upon the key frames while floating the QP value until the first PSNR target is achieved.

8. The method of claim 1, further comprising:
encoding a primary encoded video stream comprising the hierarchical stream;
encoding a secondary non-hierarchically encoded video stream associated with a lowest perceived quality and a lowest bitrate, wherein encoding of the secondary encoded video stream is also controlled to QP values determined based on a perceived quality target; and
simulcasting the primary and secondary encoded video streams to a remote decoder.

9. The method of claim 8, wherein:
encoding the frames into the hierarchical stream, further comprises:
encoding the frames into a first hierarchical stream by encoding frames of a first base layer and frames of a first hierarchically predicted enhancement layer with encoding parameter values determined based on a first PSNR target associated with a highest perceived quality target; and
the method further comprises:
encoding the frames into a second hierarchical stream by encoding frames of a second base layer and frames of a second hierarchically predicted enhancement layer with encoding parameter values determined based on a second PSNR target associated with a lower perceived quality target;
determining a current bitrate budget; and
constructing the primary encoded video stream from the first or second hierarchical stream associated with the best-perceived quality permitted by the current bitrate budget.

10. The method of claim 8, wherein:
encoding the frames into the hierarchical stream further comprises:
encoding the frames into a first hierarchical stream by encoding frames of a first base layer and frames of a first hierarchically predicted enhancement layer with encoding parameter values determined based on a first PSNR target associated with a highest perceived quality target;
constructing the secondary stream further comprises resending a key frame of the first hierarchical stream; and
in response to a bitrate budget reduction, the method further comprises:
encoding the frames into a second hierarchical stream by encoding frames of a second base layer and frames of a second hierarchically predicted enhancement layer with encoding parameter values determined based on a second PSNR target associated with a lower perceived quality target; and
wherein constructing the secondary stream comprises sending an error recovery sequence for a key frame of the second hierarchical stream.

11. A scalable video encoder comprising:
a video input to receive raw video frames;
a processor to:
determine, for first frames encoded into a non-hierarchical calibration structure comprising a single layer stream of a predetermined constant frame rate, an encoding quantization parameter (QP) value corresponding to a predetermined perceived quality level target by floating the QP value and iteratively encoding the first frames until the predetermined perceived quality level target is achieved for a given bitrate budget;
generate a reconstructed frame from data encoded with the QP value that achieves the perceived quality level target;
determine, based on a difference between the reconstructed frame and a corresponding raw frame, a calibration peak signal-to-noise ratio (PSNR) target associated with the perceived quality level target; and
encode second frames into a hierarchical stream including a base layer and one or more temporal or quality enhancement layers using QP values determined for each layer based on the PSNR target determined from the calibration structure to correspond with a perceived quality level target assigned to each layer of the hierarchical stream; and
a memory to store the hierarchical stream.

12. The scalable video encoder of claim 11, wherein the processor is to estimate perceived quality of a stream by generating an estimated mean opinion score (eMOS) for the calibration structure or for a top temporal enhancement layer of the hierarchical stream.

13. The scalable video encoder of claim 11, wherein:
the processor is to change a video perceived quality level of the hierarchical stream to a next lower perceived quality target in response to network congestion by dropping a temporal enhancement layer or encoding frames of any remaining temporal enhancement layer at a reduced PSNR target that was mapped for the calibration structure to the next lower perceived quality level target.

14. A networked communication system, comprising:
a transmit device, including:
   a scalable video encoder, further comprising:
      a video input to receive video frames; and
      a processor to:
         determine, for first frames encoded into a non-hierarchical calibration structure comprising a single layer stream of a predetermined constant frame rate, an encoding quantization parameter (QP) value corresponding to a predetermined perceived quality level target by floating the QP value and iteratively encoding the first frames until the predetermined perceived quality level target is achieved for a given bitrate budget;
         generate a reconstructed frame from data encoded with the QP value that achieves the perceived quality level target;
         determine, based on a difference between the reconstructed frame and a corresponding raw frame, a calibration peak signal-to-noise ratio (PSNR) target associated with the perceived quality level target; and
         encode second frames into a hierarchical stream including a base layer and one or more temporal or quality enhancement layers using QP values determined for each layer based on the PSNR target determined from the calibration structure to correspond with a perceived quality level target assigned to each layer of the hierarchical stream; and
         change in the target perceived quality or associated KPI in response to receiving a remote encoding rate control signal; and
a receive device, including:
   a buffer to receive the hierarchical stream;
   a processor coupled to the buffer to decode the hierarchical stream into video frames, generate a no-reference perceived quality estimate of the video frames, and output the remote encoding rate control signal to the remote-side rate adapter.

15. The system of claim 14, wherein the transmit device further comprises a cognitive radio configured to dynamically modify radio parameters based on the target perceived quality or the no-reference perceived quality estimate.

16. The system of claim 14, wherein the receive device further comprises a processor to determine a response to a lost or delayed video frame based on hierarchy information contained in the bit stream.

* * * * *